United States Patent
Chen et al.

(10) Patent No.: US 11,494,420 B2
(45) Date of Patent: Nov. 8, 2022

(54) METHOD AND APPARATUS FOR GENERATING INFORMATION

(71) Applicant: BEIJING BAIDU NETCOM SCIENCE AND TECHNOLOGY CO., LTD., Beijing (CN)

(72) Inventors: Yuguang Chen, Beijing (CN); Lu Pan, Beijing (CN); Wenhao Chen, Beijing (CN); Hui Zhou, Beijing (CN); Weina Chen, Beijing (CN); Yuhong Zheng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 185 days.

(21) Appl. No.: 16/355,304

(22) Filed: Mar. 15, 2019

(65) Prior Publication Data

US 2019/0370272 A1 Dec. 5, 2019

(30) Foreign Application Priority Data

Jun. 5, 2018 (CN) .......................... 201810567936.0

(51) Int. Cl.
*G06F 16/31* (2019.01)
*G06F 16/33* (2019.01)

(52) U.S. Cl.
CPC .......... *G06F 16/313* (2019.01); *G06F 16/322* (2019.01); *G06F 16/334* (2019.01); *G06F 2216/03* (2013.01)

(58) Field of Classification Search
CPC .... G06F 16/3344; G06F 16/38; G06F 16/313; G06F 16/322; G06F 16/334; G06F 2216/03
See application file for complete search history.

(56) References Cited

U.S. PATENT DOCUMENTS

2013/0268262 A1\* 10/2013 Moilanen ................ G06F 40/40
704/9
2015/0127323 A1   5/2015 Jacquet et al.
(Continued)

FOREIGN PATENT DOCUMENTS

KR   10-2017-0089142 A   8/2017

OTHER PUBLICATIONS

Introduction to Computational Linguistics and Dependency Trees in data science Shivam Bansal—Dec. 14, 2017 https://www.analyticsvidhya.com/blog/2017/12/introduction-computational-linguistics-dependency-trees/ (Year: 2017).\*

(Continued)

*Primary Examiner* — Mariela Reyes
*Assistant Examiner* — Courtney Harmon
(74) *Attorney, Agent, or Firm* — Seed IP Law Group LLP

(57) ABSTRACT

A method and apparatus for generating information are disclosed. An implementation of the method includes: receiving a target text, the target text including an objective and descriptive information of the objective; performing a dependency syntax parsing on the target text to generate a dependency tree of the target text; matching predetermined syntactic structure tree with the dependency tree to obtain at least one triple, a triple including a subject, a predicate, and an object; and determining, based on words contained in a triple among the at least one triple and a predetermined weight of the syntactic structure tree matched to obtain the triple, a target triple among the at least one triple.

15 Claims, 9 Drawing Sheets

(56) References Cited

U.S. PATENT DOCUMENTS

| | | | |
|---|---|---|---|
| 2015/0370787 A1* | 12/2015 | Akbacak | G10L 15/06 |
| | | | 704/2 |
| 2016/0117359 A1* | 4/2016 | Jagota | G06F 16/3334 |
| | | | 707/750 |
| 2017/0083817 A1* | 3/2017 | Di Sciullo | G06F 40/205 |
| 2017/0228372 A1* | 8/2017 | Moreno | G06F 16/24522 |
| 2017/0357625 A1 | 12/2017 | Carpenter et al. | |
| 2019/0102375 A1* | 4/2019 | Goulikar | G06F 40/186 |

OTHER PUBLICATIONS

Sun, "Query-Guided Event Detection From News and Blog Streams," IEEE Transactions on Systems, Man, and Cybernetics Part A: Systems and Humans, 41(5):834-839, Sep. 2011.

\* cited by examiner

METHOD AND APPARATUS FOR GENERATING INFORMATION

CROSS-REFERENCE TO RELATED APPLICATIONS

This application claims priority to Chinese Patent Application No. 201810567936.0, filed with the China National Intellectual Property Administration (CNIPA) on Jun. 5, 2018, the content of which is incorporated herein by reference in its entirety.

TECHNICAL FIELD

An embodiment of the present disclosure relate to the field of computer technology, specifically to a method and apparatus for generating information.

BACKGROUND

At present, Named Entity Recognition (NER) technology and Entity Linking (EL) technology can typically be employed to mine a text for entities. Here, NER is able to recognize proper nouns, such as persons, enterprises. And EL is able to link words in a text to entities in the knowledge graph, and solves the entity co-reference problem. However, recognition and linking of events is currently impossible.

SUMMARY

An embodiment of the present disclosure provides a method and apparatus for generating information.

In a first aspect, an embodiment of the present disclosure provides a method for generating information, including: receiving a target text, the target text including an objective and descriptive information of the objective; performing a dependency syntax parsing on the target text to generate a dependency tree of the target text; match predetermined at least one syntactic structure tree with the dependency tree to obtain at least one triple, a triple including a subject, a predicate, and an object; and determining, based on words contained in a triple among the at least one triple and a predetermined weight of the syntactic structure tree matched to obtain the triple, a target triple among the at least one triple.

In some embodiments, the determining, based on words contained in a triple among the at least one triple and a predetermined weight of the syntactic structure tree matched to obtain the triple, a target triple among the at least one triple, includes: determining a quantifier and an attributive within the target text based on the dependency tree; determining an objective modified by the quantifier and an objective modified by the attributive; updating the at least one triple based on the determined quantifier, attributive and objectives; and determining the target triple among updated at least one triple.

In some embodiments, the updating the at least one triple based on the determined quantifier, attributive and objectives includes: for the triple among the at least one triple, determining whether the determined objective matches the subject or object of the triple; merging, in response to determining that the determined objective matches the subject of the triple, the quantifier and attributive modifying the determined objective with the subject of the triple, and determining a merged text as the subject of the triple; and merging, in response to determining that the determined objective matches the object of the triple, the quantifier and attributive modifying the determined objective with the object of the triple, and determining a merged text as the object of the triple.

In some embodiments, the determining, based on words contained in a triple among the at least one triple and a predetermined weight of the syntactic structure tree matched to obtain the triple, a target triple among the at least one triple includes: for the triple among the at least one triple, determining the predetermined weight of the syntactic structure tree matched to obtain the triple; determining a number of characters of the words in the triple, determining a co-occurrence degree of the words within the triple, and determining a score of the triple according to the determined weight, number and co-occurrence degree; and determining a triple with a highest score among the at least one triple as the target triple.

In some embodiments, the method further includes: obtaining at least one historical target triple; statisticising a number of historical target triples obtained by matching a given syntactic structure tree in the at least one historical target triple; and determining a weight of the at least one syntactic structure tree based on a result of the statisticising.

In some embodiments, the method further includes: determining at least one piece of historical event information relevant to the target text in a predetermined historical event information set based on the target triple; determining a similarity between the target text and the at least one piece of historical event information; and outputting historical event information having highest similarity to the target text.

In some embodiments, the historical event information includes participant information and trigger word information; and the determining at least one piece of historical event information relevant to the target text in a predetermined historical event information set based on the target triple, includes: determining whether following conditions are met: a subject or an object of the target triple matches the participant information of the historical event information within the historical event information set, or a predicate of the target triple matches the trigger word information of the historical event information within the historical event information set; and determining the historical event information meeting at least one of the above conditions being relevant to the target text.

In some embodiments, the historical event information includes keywords; and the determining a similarity between the target text and the at least one piece of historical event information includes: segmenting the target text to obtain a first word set; and for the historical event information among the at least one piece of historical event information, concatenating keywords in the historical event information, segmenting a text obtained by concatenating, to obtain a second word set; and determining a similarity between the target text and the historical event information based on the first word set and the second word set.

In a second aspect, an embodiment of the present disclosure provides an apparatus for generating information, including: a target text receiving unit, which is configured to receive a target text, the target text including an objective and descriptive information of the objective; a dependency tree generating unit, which is configured to perform a dependency syntax parsing on the target text to generate a dependency tree of the target text; a triple determining unit, which is configured to match predetermined at least one syntactic structure tree with the dependency tree to obtain at least one triple, a triple including a subject, a predicate, and an object; and a target triple determining unit, which is configured to determine, based on words contained in a triple among the at least one triple and a predetermined weight of the syntactic structure tree matched to obtain the triple, a target triple among the at least one triple.

In some embodiments, the target triple determining unit includes: an attributive determining module, which is configured to determine a quantifier and an attributive within the target text based on the dependency tree; an objective determining module, which is configured to determine an objective modified by the quantifier and an objective modified by the attributive; a triple updating module, which is configured to update the at least one triple based on the determined quantifier, attributive and objectives; and a target triple determining module, which is configured to determine the target triple among updated at least one triple.

In some embodiments, the triple updating module is further configured to: for the triple among the at least one triple, determine whether the determined objective matches the subject or object of the triple; merge, in response to determining that the determined objective matches the subject of the triple, the quantifier and attributive modifying the determined objective with the subject of the triple, and determine a merged text as the subject of the triple; and merge, in response to determining that the determined objective matches the object of the triple, the quantifier and attributive modifying the determined objective with the object of the triple, and determine a merged text as the object of the triple.

In some embodiments, the target triple determining unit is further configured to: for the triple among the at least one triple, determine the predetermined weight of the syntactic structure tree matched to obtain the triple; determine a number of characters of the words in the triple, determine a co-occurrence degree of the words within the triple, and determine a score of the triple according to the determined weight, number and co-occurrence degree; and determine a triple with the highest score among the at least one triple as the target triple.

In some embodiments, the apparatus further includes a weight setting unit, the weight setting unit includes: a historical target triple module, which is configured to obtain at least one historical target triple; a triple number statisticising module, which is configured to statisticise a number of historical target triples obtained by matching a given syntactic structure tree in the at least one historical target triple; and a weight determining module, which is configured to determine a weight of the at least one syntactic structure tree based on a result of the statisticising.

In some embodiments, the apparatus further includes: a historical event information determining unit, which is configured to determine at least one piece of historical event information relevant to the target text in a predetermined historical event information set based on the target triple; a similarity determining unit, which is configured to determine a similarity between the target text and the at least one piece of historical event information; and a historical event information outputting unit, which is configured to output historical event information having the highest similarity to the target text.

In some embodiments, the historical event information includes participant information and trigger word information; and the historical event information determining unit is further configured to: determine whether following conditions are met: a subject or an object of the target triple matches the participant information of the historical event information within the historical event information set, or a predicate of the target triple matches the trigger word information of the historical event information within the historical event information set; and determine the historical event information meeting at least one of the above conditions being relevant to the target text.

In some embodiments, the historical event information includes keywords; and the similarity determining unit is further configured to: segment the target text to obtain a first word set; and for the historical event information among the at least one piece of historical event information, concatenate keywords in the historical event information, segment a text obtained by concatenating, to obtain a second word set; and determine a similarity between the target text and the historical event information based on the first word set and the second word set.

In a third aspect, an embodiment of the present disclosure provides an apparatus, including: one or more processors; and a storage device, on which are stored one or more programs, when the one or more programs are executed by the one or more processors, they cause the one or more processors to implement the method as described in any embodiment of the first aspect.

In a forth aspect, an embodiment of the present disclosure provides a computer-readable medium, on which is stored a computer program, wherein, when the program is executed by a processor, it implement the method as described in any embodiment of the first aspect.

The method and apparatus for generating information provided in the embodiment of the present disclosure, after receiving the target text, may perform a dependency syntax parsing on target text to generate a dependency tree of the target text; then, it may match predetermined at least one syntactic structure tree with the dependency tree to obtain at least one triple; and finally, a target triple among the at least one triple is determined based on the words contained in each triple among the at least one triple, and a predetermined weight of the syntactic structure tree matched to obtain the triple. The method and apparatus in the present embodiments, can pick out a triple that is most relevant to the event contained in the target text, thereby improving the accuracy of extracting a target triple.

BRIEF DESCRIPTION OF THE DRAWINGS

Other features, objectives and advantages of the present disclosure will become more apparent upon reading the detailed description to non-limiting embodiments with reference to the accompanying drawings.

DETAILED DESCRIPTION OF THE EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
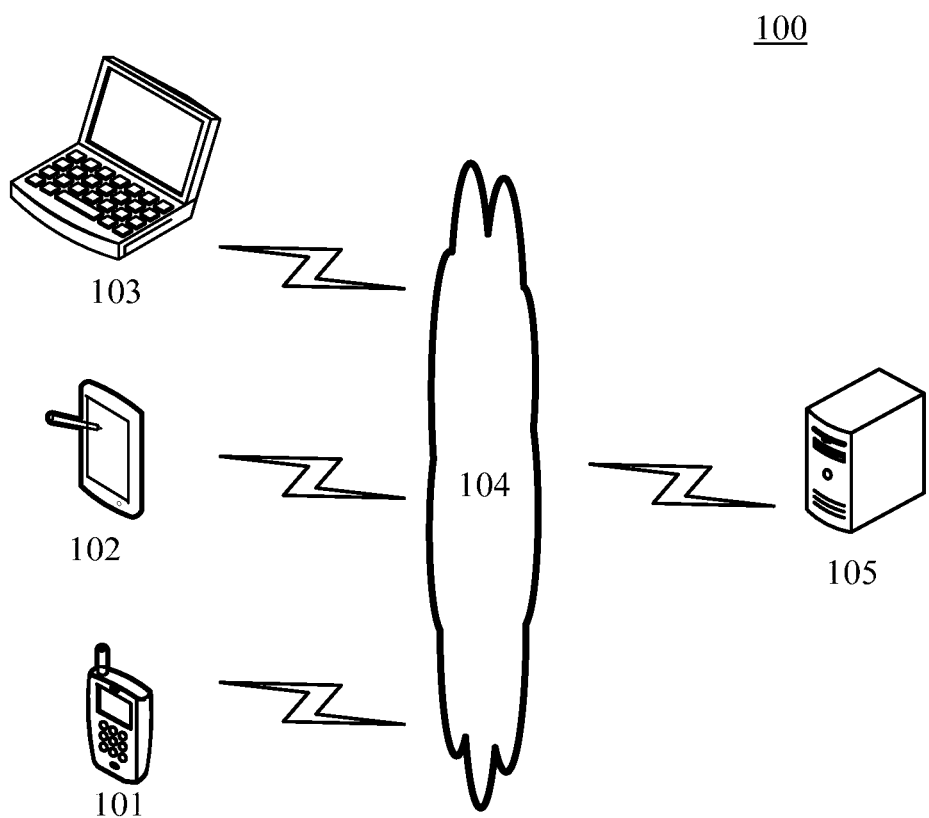
FIG. 1 is an exemplary system architecture diagram to which an embodiment of the present disclosure may be applied.

FIG. 1 illustrates an exemplary system architecture 100 to which an embodiment of a method for generating information or an apparatus for generating information of the present disclosure may be applied.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or fiber-optic cables.

The user may use the terminal devices 101, 102 and 103 to interact with the server 105 through the network 104, in order to transmit or receive messages, etc. various communication client applications, such as text input applications, web browser applications, shopping applications, search applications, instant messaging tools, mailbox clients, and social platform software may be installed on the terminal devices 101, 102 and 103.

The terminal devices 101, 102 and 103 may be hardware or software. When the terminal devices 101, 102 and 103 are hardware, they may be various electronic devices having display screens and supporting textual input, including but not limited to smart phones, tablets, e-book readers, and MP3 players (Moving Picture Experts Group Audio Layer III), MP4 (Moving Picture Experts Group Audio Layer IV) players, laptop portable computers, desktop computers, etc. When the terminal devices 101, 102 and 103 are software, they may be installed in the above-listed electronic devices. They may be implemented as a plurality of software or software modules (for example, for providing distributed services), or as a single software or software module, which is not specifically limited here.

The server 105 may be a server providing various services, for example, a background server supporting the text input on the terminal devices 101, 102, and 103. The background server may perform a processing such as an analysis on data, such as a received target text, and return a processing result (for example, a target triple) to the terminal devices 101, 102, and 103.

The server 105 may be hardware or software. When the server 105 is hardware, it may be implemented as a distributed server cluster composed of multiple servers, or may be implemented as a single server. When the server 105 is software, it may be implemented as a plurality of software or software modules (for example, for providing distributed services), or as a single software or software module, which is not specifically limited here.

It should be noted that the method for generating information provided in an embodiment of the present disclosure may be executed by the terminal device 101, 102 or 103, or may also be executed by the server 105. Accordingly, the apparatus for generating information may be installed on the terminal device 101, 102 or 103, or may also be installed on the server 105.

It is appreciated that, if the method for generating information, provided in the embodiments of the present disclosure, is executed by the terminal device 101, 102 or 103, the system architecture 100 may not include the network 104 and the server 105.

It should be appreciated that the numbers of the terminal devices, the networks and the servers in FIG. 1 are merely illustrative. Any number of terminal devices, networks and servers may be provided based on the actual requirements.

Figure 2:
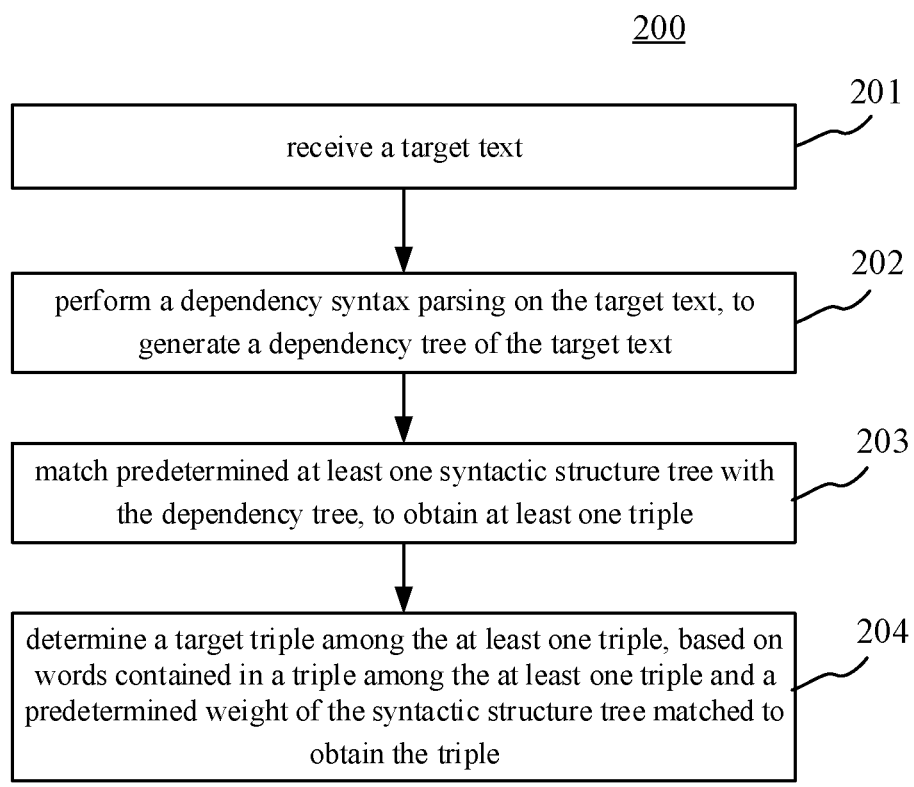
FIG. 2 is a flowchart of an embodiment of a method for generating information according to the present disclosure.

With continued reference to FIG. 2, a flow 200 of an embodiment of the method for generating information according to the present disclosure is illustrated. The method for generating information in the present embodiment includes following:

Step 201, receiving a target text.

In the present embodiment, an executor of the method for generating information (for example, terminal devices 101, 102, 103, or server 105 as shown in FIG. 1) may receive a target text. As a terminal device, the executor of the method for generating information may directly receive a target text that is input by a user through the terminal device. As a server, the executor of the method for generating information may receive a target text, through a wired or wireless connection, from a terminal device operated by a user. The target text may include an objective, and descriptive information of the objective. The above objective may be any entity that is recognized through NER technology or EL technology, such as a person, or an enterprise. The descriptive information may be information that is used to describe the objective, which includes, but is not limited to, information being used to describe the status of the objective, and information being used to describe the action of the objective, etc.

It should be pointed out that the wireless connection may include, but is not limited to, 3G/4G connection, WiFi connection, Bluetooth connection, WiMAX connection, Zigbee connection, UWB (ultra wideband) connection, and other wireless connections that are known at present or are to be developed in the future.

Step 202, performing a dependency syntax parsing on the target text to generate a dependency tree of the target text.

After receiving the target text, the executor may perform a dependency syntax parsing on the target text. Dependency syntax, also called dependency relation syntax, was first proposed by L. Tesniere, a French linguist, in 1950s. Dependency syntax is a structural syntax, describing linguistic structure of a sentence using dependency relations which are formed among words. In order to clearly describe the characteristics of the structure in the dependency syntax, the structure may be expressed through a dependency tree. Each node in the dependency tree corresponds to a word in the sentence. The dependency tree may characterize not only the dependency relationship between the words but also categories of the words (for example, a quantifier, or a particle), as well as functions of the words in the text (for example, an attributive, or an adverbial). In practical applications, the executor may perform a dependency syntax parsing on the target text through various open source toolkits. The open source toolkits may include, for example, StandfordParser—an open source toolkit provided by Stanford NLP Group at Stanford University, Fudan NLP—an open source toolkit developed by School of Computer Science at Fudan University in China.

Step 203, matching predetermined at least one syntactic structure tree with the dependency tree to obtain at least one triple.

After generating a dependency tree of the target text, the executor may match a predetermined syntactic structure tree with the dependency tree. Here, the tree-like structure of the syntactic structure tree may include a plurality of nodes, and the syntactic structure tree may include a category of a word located in each node. By matching the syntactic structure tree with the dependency tree, words in the dependency tree having the same dependency relationship with the syntactic structure tree may be obtained. Here, the category of each obtained word is identical to the category of the word of the corresponding node in the syntactic structure tree.

Figure 2A:
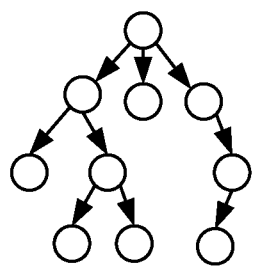
FIG. 2A is a schematic structural diagram of a dependency tree of an embodiment of a method for generating information according to the present disclosure.
Figure 2B:
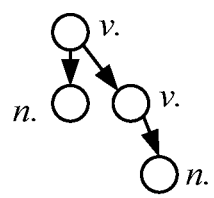
FIG. 2B is a schematic structural diagram of a syntactic structure tree of an embodiment of a method for generating information according to the present disclosure.
Figure 2C:
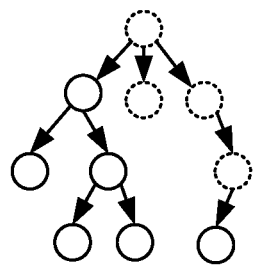
FIG. 2C is a schematic structural diagram of a candidate triple, obtained by matching the dependency tree shown in FIG. 2b with the syntactic structure tree shown in FIG. 2b, in a method for generating information according to the present disclosure.
Figure 2D:
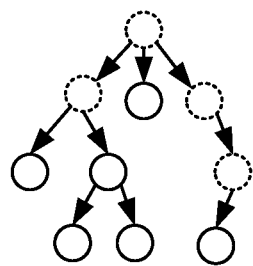
FIG. 2D is a schematic structural diagram of another candidate triple, obtained by matching the dependency tree shown in FIG. 2b with the syntactic structure tree shown in FIG. 2b, in a method for generating information according to the present disclosure.
Figure 2E:
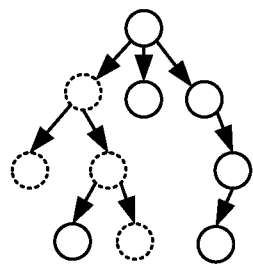
FIG. 2E is a schematic structural diagram of yet another candidate triple, obtained by matching the dependency tree shown in FIG. 2b with the syntactic structure tree shown in FIG. 2b, in a method for generating information according to the present disclosure.

For example, the structure of a dependency tree of the target text is shown in FIG. 2a, and the structure of a syntactic structure tree is shown in FIG. 2b. The syntactic structure tree shown in FIG. 2b illustrates the category of a word of each node, namely, v. represents a verb, n represents a noun. In some optional embodiments, the syntactic structure tree may be matched with the dependency tree using following approach: first, when only the structures, and not the word categories, of the syntactic structure tree and the dependency tree are considered, candidate triples formed by words located on the dotted-line nodes in FIG. 2c, FIG. 2d, and FIG. 2e can be determined. Then, the categories of the words at respective nodes in the candidate triples shown in FIG. 2c, FIG. 2d and FIG. 2e are matched with the categories of the words at respective nodes in the syntactic structure tree, to determine that the categories of the respective words in the triple shown in FIG. 2c is identical to the categories of the words at respective nodes in the syntactic structure tree. Accordingly, the triple shown in FIG. 2c is the result obtained by matching the syntactic structure tree with the dependency tree.

The triple may include a subject, a predicate, and an object, wherein the triple may be a triple in a broad sense. For example, some sentences do not have an object, then the object within the obtained triple is "null." For example, some sentences include parallel predicates, then the predicate in the obtained triple may include two words. It can be appreciated that, the subject, the predicate, and the object in the triple may be identical to the subject, the predicate, and the object in the target text, or different. For example, when the target text is "after the sharing bicycle industry expanded rapidly in 2016 and the first half of 2017, the sharing bicycle industry has gradually shown declining tendency in the second half of 2017," the obtained triples may include: the sharing bicycle industry-expand-[null], the sharing bicycle industry-has shown-declining tendency. In the target text, the subject is "the sharing bicycle industry," the predicate is "has shown," the object is "declining tendency." Here, the predicate of "expand" within the first triple is different from the predicate of "has shown" in the target text. The subject, predicate, and object in the second triple are identical to the subject, predicate, and object in the target text.

Step 204, determining, based on words contained in a triple among the at least one triple and a predetermined weight of the syntactic structure tree matched to obtain the triple, a target triple among the at least one triple.

After obtaining the at least one triple, for each triple among the at least one triple, the executor may determine, based on words contained in the triple and a predetermined weight of the syntactic structure tree matched to obtain the triple, a target triple among the at least one triple. Here, the weight of the syntactic structure tree may be set by those skilled in the art based on a specific application scenario. For example, those skilled in the art may select one syntactic structure tree at a time from the at least one syntactic structure tree to perform a matching of triple, and may set the weight based on the number of syntactic structure tree being selected and used in the matching of triple in a past time interval. Alternatively, those skilled in the art may also set the weight based on the number of nodes contained in the syntactic structure tree.

Figure 3:
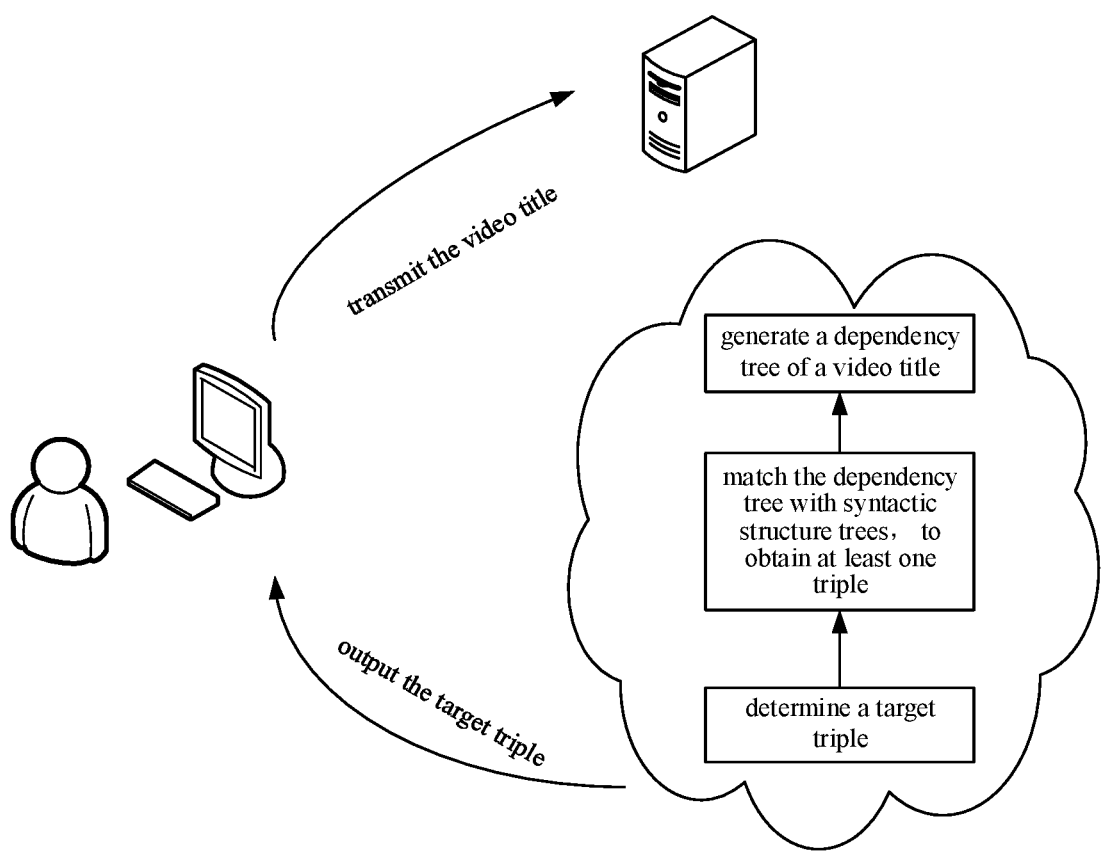
FIG. 3 is a schematic diagram of an application scenario of a method for generating information according to the present disclosure.

With continued reference to FIG. 3, FIG. 3 is a schematic diagram of an application scenario of the method for generating information according to the present embodiment. In the application scenario of FIG. 3, a user inputs a target text as a video title through a terminal, and the terminal transmits the video title to a server. After receiving the video title, the sever may initially generate a dependency tree of the video title, and then may match the video title with the syntactic structure tree to obtain at least one triple, and may further determine a target triple among the at least one triple. Finally, the server may output the target triple to the terminal for the user to check.

The method for generating information provided by the above embodiment of the present disclosure, after receiving a target text, may execute a dependency syntax parsing on the target text to generate a dependency tree of the target text. The method then matches a predetermined syntactic structure tree with the dependency tree to obtain at least one triple. Finally, the method determines a target triple among the at least one triple based on words contained in a triple among the at least one triple and a predetermined weight of the syntactic structure tree matched to obtain the target triple. The method of the present embodiment may select a triple that is most relevant to an event contained in a target text, thereby improving the accuracy of extracting a target triple.

In some alternative implementations of the present embodiment, the executor may determine a weight of syntactic structure tree according to following steps, not shown in FIG. 2: first, obtaining at least one historical target triple; then, statisticising the number of the historical target triples obtained by matchings of a given syntactic structure tree in the at least one historical target triple; finally, determining a weight of the at least one syntactic structure tree based on a result of the statisticising.

In the present implementation, the executor may first obtain at least one historical target triple, a historical target triple is a target triple obtained through a processing performed by the executor on the received target text in a past time interval. Then, the executor may statisticise the number of the historical target triples obtained by matching a given syntactic structure tree in the at least one historical target triple. It should be appreciated that the greater is the number of the historical target triples obtained by matching a certain syntactic structure tree, the higher the accuracy of the certain syntactic structure tree is, and the greater the weight of the syntactic structure tree should be. Finally, the executor may determine the weights of the respective syntactic structure trees based on the result of the statisticising. For example, the executor obtains one hundred of historical target triples, and after statisticising, finds that fifty of the historical target triples are obtained from syntactic structure tree a, and thirty of the historical target triples are obtained from syntactic structure tree b, and the remaining twenty of historical target triples are obtained from syntactic structure tree c. The executor may determine, based on the result of the statisticising, the weight of syntactic structure tree a as 50/100=0.5, the weight of syntactic structure tree b as 30/100=0.3, and the weight of syntactic structure tree c as 20/100=0.2.

The method for generating information in the present implementation may adjust in time, in combination with the historical target triple, the weight of syntactic structure tree, thereby improving the accuracy of determining a target triple.

Figure 4:
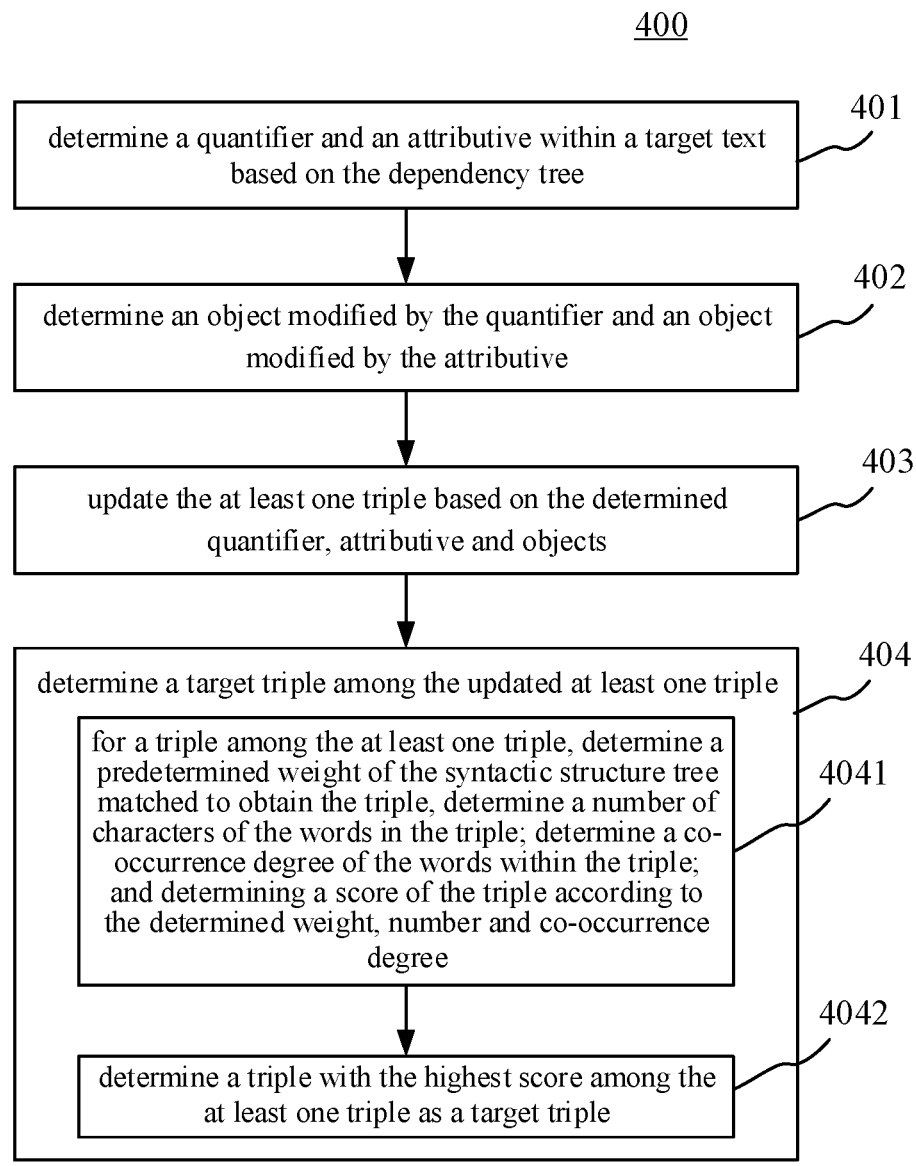
FIG. 4 is a flowchart of determining a target triple in a method for generating information according to the present disclosure.

With continued reference to FIG. 4, a flow 400 of determining a target triple in the method for generating information according to the present disclosure is illustrated. As shown in FIG. 4, the present disclosure may determine the triple according to steps as follow:

Step 401, determining a quantifier and an attributive within a target text based on the dependency tree.

In the present embodiment, since the category and function of a word have been characterized in the dependency tree, the executor may determine a quantifier and an attributive within a target text based on the generated dependency tree of the target text. An attributive is used to modify a subject or an object, and may include the noun, the pronoun and the adjective.

Step 402, determining an objective modified by the quantifier and an objective modified by the attributive.

After determining the quantifier and the attributive, the executor may determine an objective modified by the quantifier and an objective modified by the attributive. The objectives may be the subject within the triple, or may also be the object within the triple. For example, in a text of "one apple," "one" is a quantifier, and "apple" is the objective modified by the quantifier "one". In a text of "red apple," the "red" is an attributive, and the "apple" is the objective modified by the attributive "red".

Step 403, updating the at least one triple based on the determined quantifier, attributive and objectives.

After determining the quantifier, the attributive, and the objectives modified by them, the executor may update at least one triple. For example, in response to a determined objective being an object of a triple, the executor may merge the quantifier and/or the attributive, modifying the objective with the objective, and take the merged text as a new object of the triple, thereby updating the triple. Through the update, in one respect, words of each triple can be increased, and a target triple can be determined by number of characters contained in the updated triple, thereby improving the accuracy of determining a target triple. For example, when the target text is "Zhang San attends the Shenzhen birthday party," the executor may match, after generating a dependency tree, the dependency tree with a syntactic structure tree to obtain a triple of "Zhang San-attends-the Shenzhen," and a triple of "Zhang San-attends-birthday party". Based on the dependency tree, "the Shenzhen" is determined as an attributive of "birthday party," accordingly, the executor may update to obtain a triple of "Zhang San-attends-the Shenzhen birthday party."

In some alternative implementations of the present embodiment, the step 403 may further include content, not shown in FIG. 4, as follows: deleting from the at least one triple the triple of which the object matches the attributive within the target text.

In the present implementation, the executor may determine whether there is a triple of which the object is the attributive of the target text among the obtained at least one triple. If there is, the executor may delete the triple. For example, for the triple of "Zhang San-attends-the Shenzhen," the executor may determine that "the Shenzhen," serving as an attributive, should not serve as an object of the triple. Therefore, the executor may determine that the triple of "Zhang San-attends-the Shenzhen" is incorrect, and may delete the triple. Thus, the amount of calculation can be decreased effectively, and the efficiency of calculation can be improved.

In some alternative implementations of the present embodiment, the executor may update the triple through steps, that are not shown in FIG. 4, as follow: first of all, for a triple among the at least one triple, whether the determined objective matches the subject or object of the triple is determined; then, after determining that the determined objective matches the subject of the triple, the quantifier and attributive modifying the determined objective are merged with the subject of the triple, and the merged text is determined as the subject of the triple. Then, after determining that the determined objective matches the object of the triple, the quantifier and attributive modifying the determined objective are merged with the object of the triple, and the merged text is determined as the object of the triple.

For each triple among the at least one triple, the executor may first determine whether the determined objective matches the subject or object of the triple. It is appreciated that, the "match" herein may indicate that at least one character of the objective is identical to at least one character of the subject or object within the triple. For example, when the objective is "Mr. Zhang," and the subject of the triple is "Mr. Zhang San," it can be determined that the above objective matches the subject of the triple.

If it is determined that the determined objective matches the subject of the triple, the executor may merge the quantifier and attributive modifying the above objective with the subject of the triple, and take a merged text as the subject of the triple. For example, when the objective is "Mr. Zhang," the attributive modifying the objective is "refreshed," while the subject of the triple is "Mr. Zhang San," the merged text may be as "refreshed Mr. Zhang San." And then, the "refreshed Mr. Zhang San" is took as the subject of the triple, thereby implementing an update on the subject of the triple.

After determining that the determined objective matches the object of the triple, the executor may merge the quantifier and attributive modifying the objective with the object of the triple, and take a merged text as the object of the triple. Thereby implementing an update on the object of the triple.

It is appreciated that, during updating the triple, the executor may only update the subject of the triple, may also only update the object of the triple, or may even update both the subject and object of the triple. And, when performing the above merging operation, the executor may take any one of the quantifier or the attributive to merge with the subject of the triple, or with the object of the triple.

Step 404, determining a target triple among the updated at least one triple.

After updating the triple, the executor may determine a target triple among the updated at least one triple. Specifically, the executor may determine a target triple according to the following:

At sub-step 4041, for a triple among the at least one triple, determining a predetermined weight of the syntactic structure tree matched to obtain the triple; determining the number of characters in the words included in the triple; determining a co-occurrence degree of the words within the triple; and determining a score of the triple based on the determined weight, number and co-occurrence degree.

For each triple among the at least one triple, the executor may first determine a weight of the syntactic structure tree which was matched to obtain the triple. Then, the executor may determine the number of characters in the words included in the triple based on the words included in the triple. And, the executor may determine a co-occurrence degree of the words within the triple. Finally, the executor may calculate a score of the triple based on the determined weight, the determined number of characters and the determined co-occurrence degree. The co-occurrence herein may indicate a word within the triple appearing in a given sentence, a given paragraph or a given article. The co-occurrence degree may be a product of the following three: the probability of the appearance of a first word within the triple, the probability of the appearance of a second word on the basis of the appearance of the first word, and the probability of the appearance of a third word on the basis of the appearances of the first and second words.

For example, the triple is "Zhang San-visits-a newborn", the executor may first determine the probability of the appearance of "Zhang San" in a predetermined information set. The information set may be a set of webpage themes, a set of a plurality of articles, etc. Supposing that the information set includes ten thousand pieces of information, within which there is a hundred pieces of the information including "Zhang San", then the probability of the appearance of "Zhang San" would be 1%. And, the executor may determine the probability of the appearance of "visits" in the information that is in the information set and including "Zhang San." Supposing that, within the hundred pieces of information including "Zhang San", there is twenty pieces of information including "visits", then, on the basis of the appearance of "Zhang San", the probability of the appearance of "visits" would be 20%. Then, the executor may determine, according to the same method, that on the basis of the appearances of "Zhang San" and "visits," the probability of "a newborn" appearing subsequent to the "visits" would be 50%. Accordingly, the co-occurrence degree is 1%×20%×50%=0.1%.

After obtaining the weight, the number of characters and the co-occurrence degree, the executor may determine a score of the triple according to the following formula: score=a×weight+b×the number of characters+c×co-occurrence degree. Where, a, b, or c is a predetermined coefficient.

At sub-step 4042, determining a triple with the highest score among the at least one triple as a target triple.

After obtaining the scores of the respective triples, the executor may take the triple with the highest score among the at least one triple as a target triple. It is appreciated that, the higher the score of the triple is, which means the higher the accuracy of the triple is, and the more able to express the descriptive information of the objective and the objective contained in the target text.

The method for generating information provided in the embodiment of the present disclosure, may determine a triple that is most relevant to the target text among a plurality of triples, thereby improving the accuracy of extracting a triple.

Figure 5:
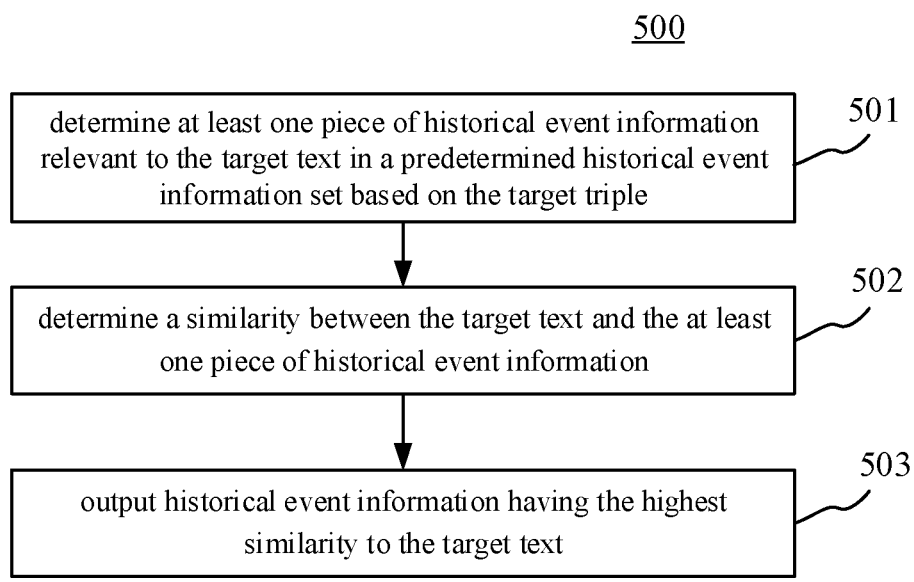
FIG. 5 is a flowchart of another embodiment of a method for generating information according to the present disclosure.

With continued reference to FIG. 5, it illustrates a flow 500 of another embodiment of the method for generating information according to the present disclosure. As shown in FIG. 5, after obtaining the target triple, the method for generating information of the present embodiment may further include:

Step 501, determining at least one piece of historical event information relevant to the target text in a predetermined historical event information set based on the target triple.

After determining the target triple, the executor may determine at least one piece of historical event information relevant to the target text in a predetermined historical event information set based on the target triple. The historical event information may also include an objective and descriptive information of the objective. In the present embodiment, when an objective within the historical event information is identical to the subject of the target triple, or when the historical event information contains the subject, the predicate or the object of the target triple, it can be determined that the historical event information is relevant to the target text.

In some alternative implementations of the present embodiment, the historical event information may include participant information and trigger word information. The executor may determine whether the historical event information and the target text are relevant according to steps, not shown in FIG. 5, as follow: first, determining whether following conditions are met: a subject or an object of the target triple matches the participant information of the historical event information within the historical event information set, or a predicate of the target triple matches the trigger word information of the historical event information within the historical event information set; then, determining the historical event information meeting at least one of the above conditions being relevant to the target text.

In the present implementation, the participant information may be information of a relevant person in a historical event. And the trigger word information may be action information of the participant information. For example, when the historical event information is "Xiaoming and Xiaohong go to the first cafeteria together to have lunch", the participant information may include "Xiaoming" and "Xiaohong," and the trigger word information is "have." Matching a subject or an object of the target triple with the participant information, if the matching is successful, it means the subject or object of the triple is identical to the participant of the historical event. Matching a predicate of the target triple with the trigger word information, and, if the matching is successful, it means the predicate of the triple is identical to the trigger word in the historical event. When at least one of the two conditions is met, the executor may determine that the historical event is relevant to the target text.

Step 502, determining a similarity between the target text and at least one piece of historical event information.

After determining at least one piece of historical event information based on the target triple, to further obtain the historical event information that is most relevant to the target text, the executor may determine the similarities between the target text and the respective pieces of historical event information among the at least one piece of historical event information. The executor may determine a similarity between the target text and a piece of historical event information based on the number of the same characters or words between the target text and the piece of historical event information. Otherwise, the executor may determine the similarity based on the number of items meeting the above conditions within the historical event information.

In some alternative implementations of the present embodiment, the historical event information may include a keyword. The keyword may be a name of an event, an occurring time of an event, etc. Here, the name of the event may include a subject, a predicate, and an object of an historical event. The executor may determine a similarity between the target text and the historical event information, according to the steps that are not shown in FIG. 5, as follow: first, the executor may segment the target text to obtain a first word set. Then, for a piece of historical event information among the at least one piece of historical event information, the executor may concatenate the keywords contained in the piece of historical event information, and may segment the text obtained by the concatenating to obtain a second word set. Then, the executor may determine the similarity between the target text and the piece of historical event information based on the first word set and the second word set.

In the present implementation, the executor may first segment the target text to obtain a first word set. During segmenting, words may be segmented based on semantic meanings, or be segmented based on the numbers of characters. Then, For each piece of historical event information among the at least one piece of historical event information, the executor may concatenate the keywords contained in the piece of historical event information, and may segment the text obtained by the concatenating to obtain a second word set. To guarantee the accuracy of the similarity, the text may be segmented at a same granularity. That is, when segmenting the target text and the text obtained by the concatenating, the text are segmented in bigram or trigram model, the numbers of characters contained in the obtained words are identical. For example, when the target text is "wo-shi-zhong-guo-ren," and the target text is segmented in bigram model, then the words "wo-shi," "shi-zhong," "zhong-guo," and "guo-ren," are obtained, or the target text is segmented in tigram model, then the words "wo-shi-zhong," "shi-zhong-guo," and "zhong-guo-ren" are obtained.

The executor, after obtaining the first word set and the second word set, may list up the words within the first word set and the second word set. Then the executor may statistic the number of appearance of each of the above words in the target text, and then combine the respective obtained numbers to obtain a first word vector A. The executor may statistic the number of appearance of each of the above words in the text obtained by concatenating, and may combine the respective obtained numbers to form a second word vector B. Then, the executor may calculate the similarity between the target text and the text obtained by concatenating according to the vector cosine formula:

$$\cos\theta = \frac{\sum_{i=1}^{n}(A_i \times B_i)}{\sqrt{\sum_{i=1}^{n}A_i^2} \times \sqrt{\sum_{i=1}^{n}B_i^2}}.$$

Where, $A=(A_1, A_2, \ldots, A_n)$, $B=(B_1, B_2, \ldots, B_n)$. $A_i$ is the i-th value of the first word vector A, and $B_i$ is the i-th value of the second word vector B.

Step 503, outputting historical event information having the highest similarity to the target text.

After determining the similarity between the target text and each piece of historical event information relevant to the target text, the executor may output the piece of historical event information having the highest similarity to the target text.

The method for generating information provided in the embodiment of the present disclosure may determine historical event information that is most relevant to the target text from the historical event information set, to enrich users' information content. The method of the present embodiment may be utilized in the aspect of video selection. The title of video may be took as a target text, and a target triple of the title of video is determined, then, a historical event relevant to the title of video is selected, thereby whether the video is an old video is determined.

Figure 6:
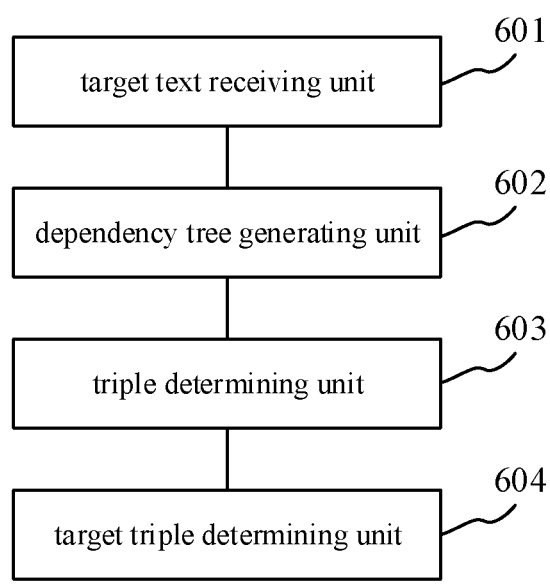
FIG. 6 is a schematic structural diagram of an embodiment of an apparatus for generating information according to the present disclosure.

Further referring to FIG. 6, as an implementation of the method shown in the above figures, the disclosure provides an embodiment of an apparatus for generating information. The embodiment of the apparatus corresponds to the embodiment of the method shown in FIG. 2. The apparatus may be specifically applied to a variety of electronic devices.

As shown in FIG. 6, the apparatus 600 for generating information, of the present embodiment, includes: a target text receiving unit 601, a dependency tree generating unit 602, a triple determining unit 603, and a target triple determining unit 604.

The target text receiving unit 601 is configured to receive a target text, the target text including an objective and descriptive information of the objective.

The dependency tree generating unit 602 is configured to perform a dependency syntax parsing on the target text to generate a dependency tree of the target text.

The triple determining unit 603 is configured to match predetermined at least one syntactic structure tree with the dependency tree to obtain at least one triple. Where the triple includes a subject, a predicate, and an object.

The target triple determining unit 604 is configured to determine, based on words contained in a triple among the at least one triple and a predetermined weight of the syntactic structure tree matched to obtain the triple, a target triple among the at least one triple.

In some alternative implementations of the present embodiment, the target triple determining unit 604 may further include an attributive determining module, an objective determining module, a triple updating module and a target triple determining module, which are not shown in FIG. 6.

The attributive determining module is configured to determine a quantifier and an attributive within the target text based on the dependency tree.

The objective determining module is configured to determine an objective modified by the quantifier and an objective modified by the attributive.

The triple updating module is configured to update the at least one triple based on the determined quantifier, attributive and objectives.

The target triple determining module is configured to determine the target triple among the updated at least one triple.

In some alternative implementations of the present embodiment, the triple updating module may be further configured to: for the triple among the at least one triple, determine whether the determined objective matches the subject or object of the triple; merge, in response to determining that the determined objective matches the subject of the triple, the quantifier and attributive modifying the determined objective with the subject of the triple, and determine a merged text as the subject of the triple; and merge, in response to determining that the determined objective matches the object of the triple, the quantifier and attributive modifying the determined objective with the object of the triple, and determine a merged text as the object of the triple.

In some alternative implementations of the present embodiment, the target triple determining unit may be further configured to: for the triple among the at least one triple, determine the predetermined weight of the syntactic structure tree matched to obtain the triple; determine a number of characters of the words in the triple, determine a co-occurrence degree of the words within the triple, and determine a score of the triple according to the determined weight, number and co-occurrence degree; and determine a triple with the highest score among the at least one triple as a target triple.

In some alternative implementations of the present embodiment, the apparatus 600 may further include a weight setting unit that is not shown in FIG. 6. The weight setting unit may include a historical target triple module, a triple number statisticising module, and a weight determining module.

The historical target triple module is configured to obtain at least one historical target triple.

The triple number statisticising module is configured to statisticise a number of the historical target triples obtained by matching a given syntactic structure tree in the at least one historical target triple.

The weight determining module is configured to determine a weight of the at least one syntactic structure tree based on a result of the statisticising.

In some alternative implementations of the present embodiment, the apparatus 600 may further include a historical event information determining unit, a similarity determining unit, and a historical event information outputting unit, which are not shown in FIG. 6.

The historical event information determining unit is configured to determine at least one piece of historical event information relevant to the target text in a predetermined historical event information set based on the target triple.

The similarity determining unit is configured to determine a similarity between a target text and the at least one piece of historical event information.

The historical event information outputting unit is configured to output historical event information having the highest similarity to the target text.

In some alternative implementations of the present embodiment, the historical event information may include participant information and trigger word information. The historical event information determining unit is further configured to: determine whether following conditions are met: a subject or an object of the target triple matches the participant information of the historical event information within the historical event information set, or a predicate of the target triple matches the trigger word information of the historical event information within the historical event information set; and determine the historical event information meeting at least one of the above conditions being relevant to the target text.

In some alternative implementations of the present embodiment, the historical event information may include keywords. The similarity determining unit is further configured to: segment the target text to obtain a first word set; and for the historical event information among the at least one piece of historical event information, concatenate keywords in the historical event information, segment a text obtained by concatenating, to obtain a second word set; and determine a similarity between the target text and the historical event information based on the first word set and the second word set.

The apparatus for generating information provided in the embodiment of the present disclosure, after receiving a target text, may perform a dependency syntax parsing on the target text to generate a dependency tree of the target text; and then match the predetermined at least one syntactic structure tree with the dependency tree to obtain at least one triple; finally, determine a target triple among the at least one triple based on the words contained in a triple among the at least one triple, and a predetermined weight of the syntactic structure tree matched to obtain the triple. The apparatus of the present embodiment can pick out a triple that is most relevant to the event contained in the target text, thereby improving the accuracy of extracting a target triple.

It should be understood that the unit 601 to unit 604, which are recited in the apparatus 600 for generating information, correspond to steps of the method described in FIG. 2. Thus, the operations and features, described above for the method for generating information, are equally applicable to the apparatus 600 and the units included therein, and detailed description thereof will be omitted.

Figure 7:
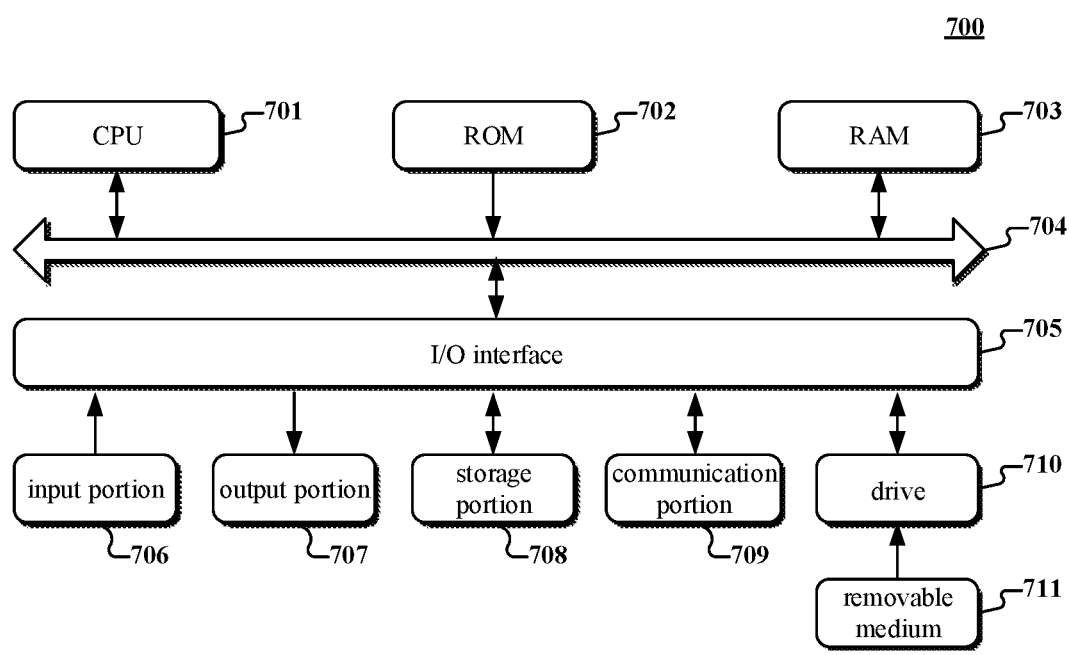
FIG. 7 is a schematic structural diagram of a computer system, that is appropriate for implementing an equipment, in an embodiment of the present disclosure.

Referring to FIG. 7, a schematic structural diagram of a computer system 700 adapted to implement the apparatus of the embodiments of the present disclosure is shown. The apparatus shown in FIG. 7 is merely an example and should not impose any restriction on the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A drive 710 is also connected to the I/O interface 705 as required. A removable medium 711, such as a magnetic disk, an optical disk, a magneto-optical disk, and a semiconductor memory, may be installed on the drive 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above.

In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier wave, in which computer readable program codes are carried. The propagating signal may take various forms, including but not limited to: an electromagnetic signal, an optical signal or any suitable combination of the above. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include objective-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a target text receiving unit, a dependency tree generating unit, a triple determining unit, and a target triple determining unit. Where the names of these units do not in some cases constitute a limitation to such units themselves. For example, the target text receiving unit may also be described as "a unit for receiving a target text."

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: receive a target text, the target text comprising an objective and descriptive information of the objective; perform a dependency syntax parsing on the target text to generate a dependency tree of the target text; match the predetermined at least one syntactic structure tree with the dependency tree to obtain at least one triple, a triple comprising a subject, a predicate, and an object; and determine, based on words contained in a triple among the at least one triple and a predetermined weight of the syntactic structure tree matched to obtain the triple, a target triple among the at least one triple.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A computer-implemented method for generating information, the method comprising:
   receiving, by a processor, a target text inputted by a user through a terminal device, the target text comprising an objective and descriptive information of the objective;
   running, by the processor, an open source toolkit to perform dependency syntax parsing on the target text to generate a dependency tree of the target text, wherein each node of the generated dependency tree of the target text corresponds to a word in the target text;

matching, by the processor, at least one predetermined syntactic structure tree with the generated dependency tree to obtain at least one triple, wherein each triple in the at least one triple is formed by nodes of the generated dependency tree and comprises a subject, a predicate, and an object, wherein a tree-like structure of each predetermined syntactic structure tree includes a plurality of nodes, and the each predetermined syntactic structure tree includes a category of a word located in each node;

for each triple in the at least one triple, determining, by the processor, a score of the each triple based on characteristics of words contained in the each triple and a predetermined weight of a predetermined syntactic structure tree matched to obtain the each triple, and determining a target triple among the at least one triple according to the score of the each triple, wherein the score of the each triple is for scoring accuracy of the each triple in expressing the objective and the descriptive information of the objective comprised in the target text;

determining, based on the target triple, at least one piece of historical event information relevant to the target text from a predetermined historical event information set;

determining a similarity between the target text and the at least one piece of historical event information; and outputting a piece of historical event information having a highest similarity to the target text, wherein the method further comprises obtaining a predetermined weight of the at least one predetermined syntactic structure tree, comprising:

obtaining historical target triples, wherein the historical target triples is obtained in a past time interval by processing target texts received in the past time interval;

statisticising a number of historical target triples that is obtained by matching each predetermined syntactic structure tree with the historical target triples; and determining a predetermined weight of each predetermined syntactic structure tree in the at least one predetermined syntactic structure tree based on a result of the statisticising.

2. The method according to claim 1, wherein the determining the target triple among the at least one triple, comprises:

determining a quantifier and an attributive within the target text based on the dependency tree;

determining an objective modified by the quantifier and an objective modified by the attributive;

updating the at least one triple based on the determined quantifier, attributive and objectives; and determining the target triple among updated at least one triple.

3. The method according to claim 2, wherein the updating the at least one triple based on the determined quantifier, attributive and objectives, comprises:

for a triple among the at least one triple, determining whether the determined objective matches the subject or object of the triple;

merging, in response to determining that the determined objective matches the subject of the triple, the quantifier and attributive modifying the determined objective with the subject of the triple, and determining a merged text as the subject of the triple; and merging, in response to determining that the determined objective matches the object of the triple, the quantifier and attributive modifying the determined objective with the object of the triple, and determining a merged text as the object of the triple.

4. The method according to claim 3, wherein the determining the target triple among the at least one triple, comprises:

for a triple among the at least one triple, determining a predetermined weight of a predetermined syntactic structure tree matched to obtain the triple; determining a number of words contained in the triple, determining a co-occurrence degree of the words contained in the triple, and determining a score of the triple according to the determined predetermined weight of the predetermined syntactic structure tree matched to obtain the triple, the determined number of the words contained in the triple and the determined co-occurrence degree of the words contained in the triple; and determining a triple with a highest score among the at least one triple as the target triple.

5. The method according to claim 2, wherein the determining the target triple among the at least one triple, comprises:

for a triple among the at least one triple, determining a predetermined weight of a predetermined syntactic structure tree matched to obtain the triple; determining a number of words contained in the triple, determining a co-occurrence degree of the words contained in the triple, and determining a score of the triple according to the determined predetermined weight of the predetermined syntactic structure tree matched to obtain the triple, the determined number of the words contained in the triple and the determined co-occurrence degree of the words contained in the triple; and determining a triple with a highest score among the at least one triple as the target triple.

6. The method according to claim 1, wherein the determining the target triple among the at least one triple, comprises:

for a triple among the at least one triple, determining a predetermined weight of a predetermined syntactic structure tree matched to obtain the triple; determining a number of words contained in the triple, determining a co-occurrence degree of the words contained in the triple, and determining a score of the triple according to the determined predetermined weight of the predetermined syntactic structure tree matched to obtain the triple, the determined number of the words contained in the triple and the determined co-occurrence degree of the words contained in the triple; and determining a triple with a highest score among the at least one triple as the target triple.

7. The method according to claim 1, wherein the historical event information comprises participant information and trigger word information; and the determining at least one piece of historical event information relevant to the target text in the predetermined historical event information set based on the target triple comprises:

determining whether following conditions are met: a subject or an object of the target triple matches the participant information of the historical event information within the historical event information set, or a predicate of the target triple matches the trigger word information of the historical event information within the historical event information set; and determining the historical event information meeting at least one of the above conditions being relevant to the target text.

8. The method according to claim 1, wherein the historical event information comprises keywords; and
the determining a similarity between the target text and the at least one piece of historical event information comprises:
segmenting the target text to obtain a first word set; and
for each piece of historical event information among the at least one piece of historical event information, concatenating keywords in the piece of historical event information to obtain a concatenated text, segmenting the concatenated text to obtain a second word set statisticising a number of appearance in the target text of each word of the first and second word sets to obtain respective numbers of appearances of words of the first and second word sets, and combining the obtained respective numbers of appearances to obtain a first word vector;
statisticising a number of appearance in the concatenated text of each word of the first and second word sets to obtain respective numbers of appearances of the words of the first and second word sets, and combining the obtained respective numbers of appearances to obtain a second word vector; and
calculating the similarity between the target text and the piece of historical event information based on the first word vector and the second word vector.

9. An apparatus for generating information, comprising:
at least one processor; and
a memory storing instructions, the instructions when executed by the at least one processor, cause the at least one processor to perform operations, the operations comprising:
receiving a target text inputted by a user through a terminal device, the target text comprising an objective and descriptive information of the objective;
running an open source toolkit to perform dependency syntax parsing on the target text to generate a dependency tree of the target text, wherein each node of the generated dependency tree of the target text corresponds to a word in the target text;
matching at least one predetermined syntactic structure tree with the generated dependency tree to obtain at least one triple, wherein each triple in the at least one triple is formed by nodes of the generated dependency tree and comprises a subject, a predicate, and an object, wherein a tree-like structure of each predetermined syntactic structure tree includes a plurality of nodes, and the each predetermined syntactic structure tree includes a category of a word located in each node;
for each triple in the at least one triple, determining, a score of the each triple based on characteristics of words contained in the each triple and a predetermined weight of a predetermined syntactic structure tree matched to obtain the each triple, and determining a target triple among the at least one triple according to the score of the each triple, wherein the score of the each triple is for scoring accuracy of the each triple in expressing the objective and the descriptive information of the objective comprised in the target text;

determining, based on the target triple, at least one piece of historical event information relevant to the target text from a predetermined historical event information set;
determining a similarity between the target text and the at least one piece of historical event information; and
outputting a piece of historical event information having a highest similarity to the target text,
wherein the operations further comprise obtaining a predetermined weight of the at least one predetermined syntactic structure tree, comprising:
obtaining historical target triples, wherein the historical target triples is obtained in a past time interval by processing target texts received in the past time interval;
statisticising a number of historical target triples that is obtained by matching each predetermined syntactic structure tree with the historical target triples; and
determining a predetermined weight of each predetermined syntactic structure tree in the at least one predetermined syntactic structure tree based on a result of the statisticising.

10. The apparatus according to claim 9, wherein the determining the target triple among the at least one triple, comprises:
determining a quantifier and an attributive within the target text based on the dependency tree;
determining an objective modified by the quantifier and an objective modified by the attributive;
updating the at least one triple based on the determined quantifier, attributive and objectives; and
determining the target triple among updated at least one triple.

11. The apparatus according to claim 10, wherein the updating the at least one triple based on the determined quantifier, attributive and objects, comprises:
for a triple among the at least one triple, determining whether the determined objective matches the subject or object of the triple;
merging, in response to determining that the determined objective matches the subject of the triple, the quantifier and attributive modifying the determined objective with the subject of the triple, and determining a merged text as the subject of the triple; and
merging, in response to determining that the determined objective matches the object of the triple, the quantifier and attributive modifying the determined objective with the object of the triple, and determining a merged text as the object of the triple.

12. The apparatus according to claim 9, wherein the determining the target triple among the at least one triple, comprises:
for a triple among the at least one triple, determining a predetermined weight of a predetermined syntactic structure tree matched to obtain the triple; determining a number of words contained in the triple, determining a co-occurrence degree of the words contained in the triple, and determining a score of the triple according to the determined predetermining weight of the predetermined syntactic structure tree matched to obtain the triple, the determined number of the words contained in the triple and the determined co-occurrence degree of the words contained in the triple; and
determining a triple with a highest score among the at least one triple as the target triple.

13. The apparatus according to claim 9, wherein the historical event information comprises participant information and trigger word information; and the determining at least one piece of historical event information relevant to the target text in the predetermined historical event information set based on the target triple comprises:

determining whether following conditions are met: a subject or an object of the target triple matches the participant information of the historical event information within the historical event information set, or a predicate of the target triple matches the trigger word information of the historical event information within the historical event information set; and determining the historical event information meeting at least one of the above conditions being relevant to the target text.

14. The apparatus according to claim 9, wherein the historical event information comprises keywords; and the determining a similarity between the target text and the at least one piece of historical event information comprises:

segmenting the target text to obtain a first word set; and for each piece of historical event information among the at least one piece of historical event information, concatenating keywords in the piece of historical event information to obtain a concatenated text, segmenting the concatenated text to obtain a second word set statisticising a number of appearance in the target text of each word of the first and second word sets to obtain respective numbers of appearances of words of the first and second word sets, and combining the obtained respective numbers of appearances to obtain a first word vector;

statisticising a number of appearance in the concatenated text of each word of the first and second word sets to obtain respective numbers of appearances of the words of the first and second word sets, and combining the obtained respective numbers of appearances to obtain a second word vector; and calculating the similarity between the target text and the piece of historical event information based on the first word vector and the second word vector.

15. A non-transitory computer-readable medium, storing a computer program, wherein the computer program, when executed by a processor, cause the processor to perform operations, the operations comprising:

receiving a target text inputted by a user through a terminal device, the target text comprising an object and descriptive information of the object;

running an open source toolkit to perform dependency syntax parsing on the target text to generate a dependency tree of the target text, wherein each node of the generated dependency tree of the target text corresponds to a word in the target text;

matching at least one predetermined syntactic structure tree with the generated dependency tree to obtain at least one triple, wherein each triple in the at least one triple is formed by nodes of the generated dependency tree and comprises a subject, a predicate, and an object, wherein a tree-like structure of each predetermined syntactic structure tree includes a plurality of nodes, and the each predetermined syntactic structure tree includes a category of a word located in each node;

for each triple in the at least one triple, determining, a score of the each triple based on characteristics of words contained in the each triple and a predetermined weight of a predetermined syntactic structure tree matched to obtain the each triple, and determining a target triple among the at least one triple according to the score of the each triple, wherein the score of the each triple is for scoring accuracy of the each triple in expressing the objective and the descriptive information of the objective comprised in the target text;

determining, based on the target triple, at least one piece of historical event information relevant to the target text from a predetermined historical event information set determining a similarity between the target text and the at least one piece of historical event information; and outputting a piece of historical event information having a highest similarity to the target text, wherein the operations further comprise obtaining a predetermined weight of the at least one predetermined syntactic structure tree, comprising:

obtaining historical target triples, wherein the historical target triples is obtained in a past time interval by processing target texts received in the past time interval;

statisticising a number of historical target triples that is obtained by matching each predetermined syntactic structure tree with the historical target triples; and determining a predetermined weight of each predetermined syntactic structure tree in the at least one predetermined syntactic structure tree based on a result of the statisticising.

* * * * *